(12) United States Patent
Contreras et al.

(10) Patent No.: US 7,667,914 B2
(45) Date of Patent: Feb. 23, 2010

(54) DIRECT COUPLED WIDE-BANDWIDTH FRONT-END WITH SMART BIAS CONTROL AMPLIFIER

(75) Inventors: John Contreras, Palo Alto, CA (US); Klaas Klaassen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 603 days.

(21) Appl. No.: 11/405,803

(22) Filed: Apr. 17, 2006

(65) Prior Publication Data
US 2007/0242384 A1 Oct. 18, 2007

(51) Int. Cl.
G11B 5/03 (2006.01)

(52) U.S. Cl. ............ 360/66; 360/46; 360/67; 360/68

(58) Field of Classification Search ............ None
See application file for complete search history.

(56) References Cited

U.S. PATENT DOCUMENTS

| | | | | |
|---|---|---|---|---|
| 4,716,306 A * | 12/1987 | Sato et al. | ............ | 327/540 |
| 5,103,353 A * | 4/1992 | Jove et al. | ............ | 360/67 |
| 5,204,789 A * | 4/1993 | Jove et al. | ............ | 360/67 |
| 5,444,579 A * | 8/1995 | Klein et al. | ............ | 360/67 |
| 5,454,809 A | 10/1995 | Janssen | | |
| 5,736,899 A * | 4/1998 | Bowers et al. | ............ | 330/252 |
| 5,923,216 A * | 7/1999 | Pennock | ............ | 330/255 |
| 5,986,839 A * | 11/1999 | Klaassen et al. | ............ | 360/66 |
| 6,040,732 A * | 3/2000 | Brokaw | ............ | 327/408 |
| 6,054,901 A * | 4/2000 | Nainar et al. | ............ | 330/292 |
| 6,134,060 A * | 10/2000 | Ryat | ............ | 360/46 |
| 6,252,735 B1 * | 6/2001 | Chung et al. | ............ | 360/67 |
| 6,420,910 B1 * | 7/2002 | Contreras et al. | ............ | 327/77 |
| 6,424,480 B1 * | 7/2002 | Bhandari et al. | ............ | 360/67 |
| 6,532,127 B1 * | 3/2003 | Ranmuthu et al. | ............ | 360/66 |
| 6,538,833 B2 * | 3/2003 | Choi | ............ | 360/46 |
| 6,606,212 B1 * | 8/2003 | Klaassen et al. | ............ | 360/67 |
| 6,667,842 B2 * | 12/2003 | Comeau et al. | ............ | 360/67 |
| 6,822,817 B2 | 11/2004 | Chung et al. | | |
| 6,947,238 B2 * | 9/2005 | Takayoshi et al. | ............ | 360/66 |
| 7,190,214 B2 * | 3/2007 | Barnett et al. | ............ | 327/563 |
| 7,251,091 B2 * | 7/2007 | Takeuchi et al. | ............ | 360/66 |
| 7,414,804 B1 * | 8/2008 | Voo | ............ | 360/67 |
| 7,449,958 B1 * | 11/2008 | Voo | ............ | 330/296 |

* cited by examiner

*Primary Examiner*—Dismery E Mercedes
(74) *Attorney, Agent, or Firm*—Townsend and Townsend and Crew LLP; Patrick Duncan

(57) ABSTRACT

Embodiments of the present invention provide a mixed-mode amplifier for amplifying signals in data storage devices such as disk drives. In one embodiments, a circuit for amplifying data signals comprises a magnetoresistive sensor having a bias voltage applied thereto; a signal amplifier which amplifies a signal detected by the magnetoresistive sensor having the bias voltage applied thereto; a feedback control block which is coupled to an output of the signal amplifier and outputs a feedback current used to vary a loop gain of the circuit; a bias setting circuit which outputs a bias setting current; and a transimpedance amplifier which receives the bias setting current from the bias setting block and the feedback current from the feedback control block and generates the bias voltage applied to the magnetoresistive sensor.

14 Claims, 13 Drawing Sheets

(a)

(b)

DIRECT COUPLED WIDE-BANDWIDTH FRONT-END WITH SMART BIAS CONTROL AMPLIFIER

BACKGROUND OF THE INVENTION

The present invention relates to data storage devices including hard disk drives, and more particularly to amplifying data signals in such devices.

A hard disk drive is one of the most widely used external storage devices for a computer. A magnetic disk or plurality of magnetic disks are typically used as a storage medium for the hard disk drive, which uses sectors as minimum data recording units. The sectors are obtained by radially dividing tracks that are obtained by concentrically dividing the disk surface. The hard disk drive has a composite magnetic head (read/write head) which comprises two devices: a read sensor and a write element. The read sensor reads data stored on the magnetic disk, whereas the write element writes data onto the magnetic disk. The magnetic head is mounted on an actuator mechanism, which is moved by a VCM (voice coil motor).

The read sensors used for reading data from the magnetic disks typically comprise magnetoresistive (MR) sensors that are used to convert and amplify the data being read from the disk into a usable format. Today's MR read sensors are resistive, where the resistance is sensitive to magnetic flux changes that represent the data stored on the disk media. Some specific types of MR sensors that are in use today include giant magnetoresistive (GMR) sensors and tunneling magnetoresistive (TMR) sensors. When a DC bias is applied to the read sensor, the read sensor's resistance change creates the read-back signal. The following equations represent the signal produced by the read sensor:

$$V_{sig} = \Delta R * V_{bias}/R$$

$$V_{sig} = \Delta R * I_{bias}$$

where
  $V_{sig}$=the data signal from the disk media
  $\Delta R$ is the change in resistance induced by a change in the magnetic field
  R=read sensor resistance
  $V_{bias}$=DC voltage bias
  $I_{bias}$=DC current bias.

When a voltage bias $V_{bias}$ is applied to the read sensor, the change in resistance $\Delta R$ in the magnetic field can be measured, creating the equivalent data signal $V_{sig}$. Correspondingly, for an implementation using current bias, when a current bias $I_{bias}$ is applied to the read sensor, the change in resistance $\Delta R$ in the magnetic field can be measured, creating the equivalent data signal $V_{sig}$.

The signal-to-noise ratio (SNR) of the front-end system is important to processing as too much noise may cause data errors. Therefore, a required condition of both the amplifier and the bias circuit is that only a minimal amount of electronic noise be introduced into the signal by the read-back amplifier. For DC biasing, typical circuit architectures, used to remove the transducer DC bias voltage drop from the amplifier's input, involve feedback control loops and/or AC coupling capacitors. Amplifiers with a biased front-end read sensor require a means of removing the DC voltage from the read-back signal amplification. Otherwise, amplification of the read sensor DC bias would cause the amplifier to saturate and malfunction during the amplification of the read-back signal.

FIGS. 1 and 2 show two typical implementations for removing the DC bias component from the front-end of the amplifier. The implementation shown in FIG. 1 uses a feedback control loop 19 to remove the DC bias voltage. The read sensor 12 is composed of a giant magnetoresistive sensor (GMR) head 16 and the voltage source 14. The output signal 29 from the read sensor 12 is then transferred to the amplifier 18, and the outputs of the amplifier 18 are connected to both feedback loop 19 and voltage output 29. For this feedback diagram, the bias voltage 22 is interposed on the feedback loop 19, by imposing the voltage offset ($V_{bias}$ 22) internal to amplifier 18. Alternatively, this voltage offset could be placed at other parts of the feedback loop such as at the read sensor 12. Internal to amplifier 18 is the bias voltage 22. The amplifier 18 output is connected as inputs to an operational transconductance amplifier (OTA) 20. The output from the OTA 20 charge or discharge capacitors 23 and 24, which provide voltages Vcc 27 and Vee 28, respectively to both the source and gate locations of transistors 25 and 26. The amplifier 18 does not amplify the front-end DC bias applied within the feedback loop and only amplifies the read-back signal.

For the feedback control scheme shown in FIG. 1, the problem is that the recovery time from switching from the write-data mode to the read-data mode can be too long for the circuit to effectively function. There are timed recovery states that can be used to change the feedback gain of the circuit, thereby attempting to decrease the recovery time. However, this method of recovery still has difficulty in reducing the overall recovery time, because changing the loop gain affects the DC operating point, which correspondingly increases the recovery time of the circuit.

The solution shown in FIG. 2 uses AC coupling capacitors 38 and 39 connecting the read sensor 35 to the read amplifier 40 to produce output signal 42. The read sensor, again, is composed of a GMR sensor 36 and signal generator 34. Here, the DC bias voltage is isolated by the AC coupling capacitors, so the input potential of the amplifier 40 is zero and the front-end DC bias is not amplified.

For the AC coupling capacitor scheme shown in FIG. 2, the recovery time from switching from write mode to read mode is too long and there is no control of the high-pass frequency response. There are switching schemes that can be implemented in a CMOS circuit to short the amplifier's input to reduce the recovery period, but these types of switching schemes can cause voltage glitches on the read sensor. Voltage glitches can destroy the read sensor by voltage overstress or punch-through, thus making the read element inoperable.

Perpendicular recording (PR) is another problem that can compound the aforementioned problems relating to recovery time within the circuit. Today's recording methods within hard disk drives utilize longitudinal recording. Longitudinal recording, as its name indicates, aligns the data bits horizontally, parallel to the surface of the disk. In contrast, perpendicular recording aligns the bits vertically, perpendicular to the surface of the disk, which allows additional room on a disk to pack more data, thus enabling higher recording densities. Due to the characteristics of the perpendicular recording read-back signal, perpendicular recording requires a lower high-pass corner frequency than longitudinal recording. This lower high-pass corner increases the recovery time when switching from the write-data mode to the read-data mode.

Despite the availability of the above-described techniques, new methods for removing the bias across magnetoresistive sensors are desirable.

BRIEF SUMMARY OF THE INVENTION

Embodiments of the present invention provide a mixed-mode amplifier for amplifying signals in data storage devices such as disk drives. The amplifier architecture is called a direct-coupled wide-bandwidth front-end with smart-bias control (DCSB) amplifier. The DCSB amplifier has the following advantageous characteristics: low electronic noise; high bandwidth (fc≈eclk×0.5, where fclk is the data clock frequency); low phase distortion by having a single-pole high-pass frequency response; fast transient recovery; and low corner frequency (fl≈fc/K=fclk/(2 IK)), where the proportional factor K=200 to 1000 (for perpendicular recording). Low electronic noise and high bandwidth are typical requirements for a front-end amplifier used in a disk drive system and can marginally be achieved with conventional amplifiers, but low phase distortion, fast transient recovery, and a good low-corner frequency performance are only possible with a DCSB amplifier. The above requirements become even more stringent with perpendicular recording (PR). The smart bias control is attained by a self training mix-mode circuit that enables a DCSB amplifier to remember its DC operating point. With the DCSB amplifier remembering its DC operating point, the amplifier can recover very quickly from an "off" or "standby" state and has an improved frequency-response performance (low phase distortion and low corner frequency).

In accordance with an aspect of the present invention, a circuit for amplifying data signals comprises a magnetoresistive sensor having a bias voltage applied thereto; a signal amplifier which amplifies a signal detected by the magnetoresistive sensor having the bias voltage applied thereto; a feedback control block which is coupled to an output of the signal amplifier and outputs a feedback current used to vary a loop gain of the circuit; a bias setting circuit which outputs a bias setting current; and a transimpedance amplifier which receives the bias setting current from the bias setting block and the feedback current from the feedback control block and generates the bias voltage applied to the magnetoresistive sensor.

In some embodiments, a current summing unit acquires a sum of the bias setting current and the feedback current received by the transimpedance amplifier; an analog-to-digital converter converts the sum of the bias setting current and the feedback current to a digital value; and a bias logic register stores the digital value received from the analog-to-digital converter and outputs the digital value to the bias setting circuit to modify the bias setting current based on the digital value.

In specific embodiments, the magnetoresistive sensor is a giant magnetoresistive sensor; a pair of isolation resistors are coupled to the output of the transimpedance amplifier, and are disposed between the transimpedance amplifier and the magnetoresistive sensor; and the bias setting current $I_B$ is calculated based on:

$$I_B = \frac{V_{Bias}(2R_1 + R_{GMR})}{R_{GMR}(2R_1 + R_{Nom.})}$$

where $V_{Bias}$ is the bias voltage, $R_{GMR}$ is a resistance of the giant magnetoresistive sensor, $R_1$ is a resistance of each of the pair of isolation resistors, and $R_{Nom}$ is the average resistance value. Typically, the read sensor's resistance may vary by a range of 3:1. Therefore, the bias and feedback must be designed to cover this resistance range. In addition, the resistance magnitude is dependent on the sensor type (MR, GMR, and TMR).

In some embodiments, the magnetoresistive sensor comprises one of a giant magnetoresistive read sensor or a tunneling magnetoresistive read sensor. The signal amplifier uses one of a passive transistor configuration or an active transistor configuration. The bias voltage is interposed at an input of the signal amplifier and the magnetoresistive sensor is connected in parallel with the voltage bias. A second amplifier is connected to the outputs of the signal amplifier in series and disposed between the signal amplifier and the feedback control block.

In specific embodiments, the feedback control block comprises an operational transconductance amplifier (OTA) which is coupled to an output of the signal amplifier and outputs a first feedback current proportional to the signal at the output of the signal amplifier; a capacitor coupled between outputs of the OTA as a low-pass filter; a buffer circuit coupled to the capacitor which outputs a feedback voltage based on applying the first feedback current across the capacitor to generate the feedback voltage; and an adjustable current source which outputs the feedback current proportional to the feedback voltage from the buffer circuit, the feedback current being received by the transimpedance amplifier. The OTA increases the loop gain of the circuit for a predetermined period when the output of the signal amplifier is high. The OTA comprises a dead zone circuit configured to change the loop gain in response to the output of the signal amplifier. The OTA can be utilized with a standard current output stage or with an internal voltage buffer stage. The two different OTA types have a similar signal response, but the OTA with an internal voltage buffer stage has an inherent common-mode control.

In accordance with another aspect of the present invention, a data storage device comprises a magnetic disk; a head assembly having a read sensor and a write element which read data from or write data to the magnetic disk; an amplifier circuit configured to apply a bias voltage to the read sensor, amplify a playback signal of the read sensor, and supply a write current to the write element in accordance with a data pattern at the time of a data write; and a controller configured to control the head assembly to read/write data from/to the recording disk. The amplifier circuit includes a signal amplifier which amplifies a signal detected by the read sensor having the bias voltage applied thereto; a feedback control block which is coupled to an output of the signal amplifier and outputs a feedback current used to vary a loop gain of the circuit; a bias setting circuit which outputs a bias setting current; and a transimpedance amplifier which receives the bias setting current from the bias setting block and the feedback current from the feedback control block and generates the bias voltage applied to the magnetoresistive sensor.

In some embodiments, the controller comprises a hard disk drive controller configured to transfer data between an external host and the magnetic disk generating a position error signal from servo data and to transmit positional information about the head assembly to a read/write controller; a spindle/VCM driver configured to control movement of an actuator arm to move the head assembly mounted thereon over the magnetic disk, and for controlling movement of the magnetic disk; and a microprocessor configured to communicate with the hard disk drive controller and instructing the hard disk drive controller to perform a read or write operation.

DETAILED DESCRIPTION OF THE INVENTION

Figure 1:
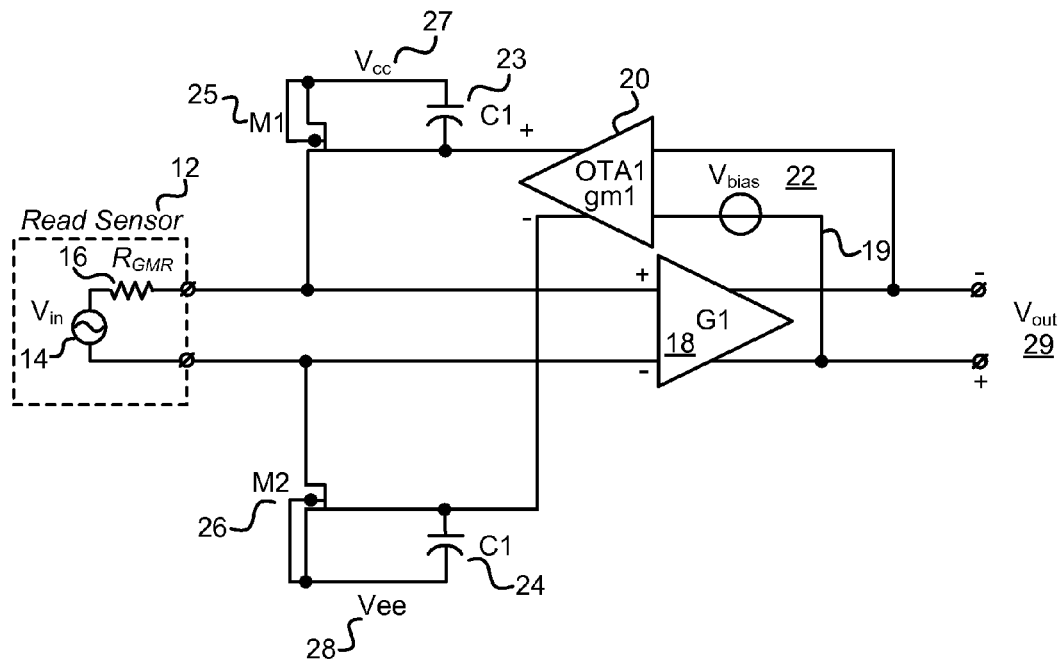
FIG. 1 is a conventional circuit used to remove a DC bias from the input signal using a feedback control loop.
Figure 2:
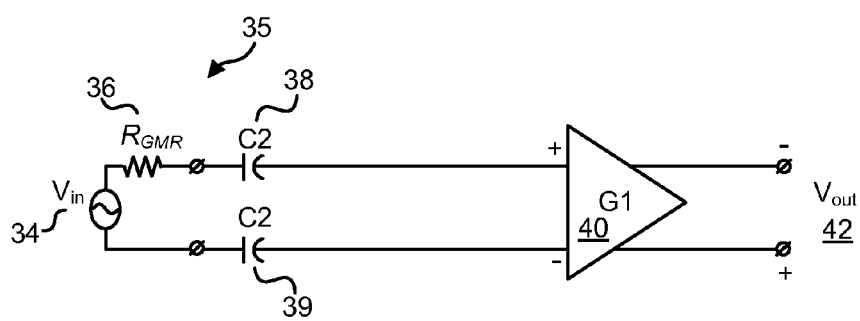
FIG. 2 is another conventional circuit used to remove the DC bias from the input signal by using AC coupling capacitors.
Figure 3:
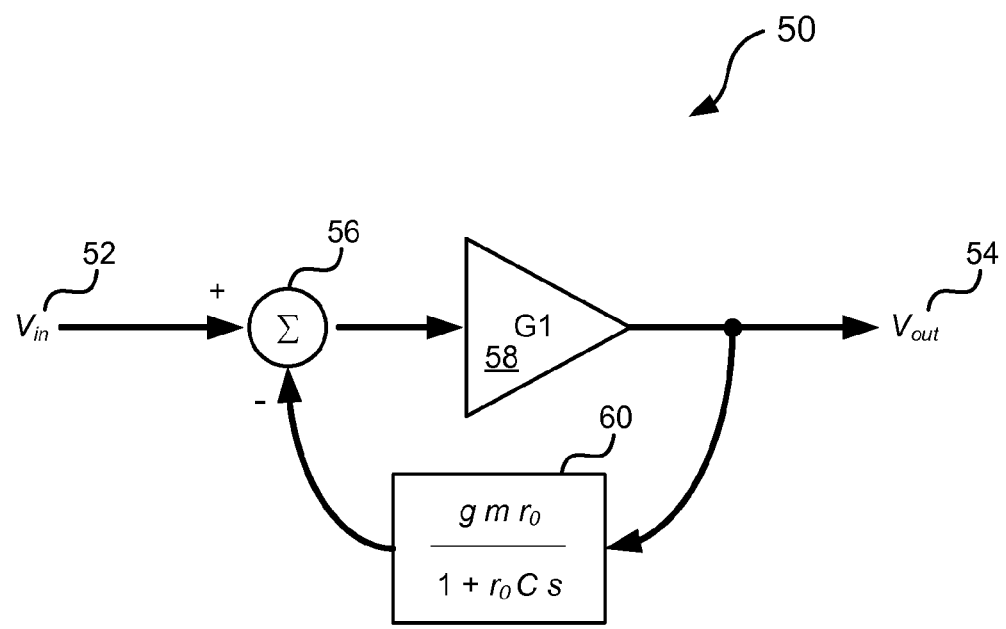
FIG. 3 is simplified representation of a first-order feedback system used to remove the DC bias from an input signal.

One aspect of the DCBS amplifier architecture relates to the feedback requirement to remove the DC bias. As mentioned earlier, the front-end amplifier only amplifies the readback signal and the feedback is used to suppress the amplification of the DC bias voltage applied to the read sensor. FIG. 3 shows a representation of a first order feedback system 50. The voltage input 52 is fed into a summing junction 56, which is then sent to amplifier 58 input. The output of the amplifier 58 goes to the voltage output 54, and also to feedback block 60. The output of the feedback block 60 is then subtracted from the voltage input 52, thus creating the feedback signal. This feedback has a frequency roll-off set by resistance value $r_0$ and capacitor value C in the feedback block 60, and the forward gain is set by the gain value G1 as determined by the amplifier 58. In addition, the feedback gain is set by the transconductance value gm, so the loop gain is then G1gm. The equivalent equations for FIG. 3 are shown below.

$$\frac{V_{out}}{V_{in}} = T(s) = \frac{G1\left(s + \frac{1}{r_0 C}\right)}{s + \frac{1 + G1 g_m r_0}{r_0 C}}$$

$$T(0) = \frac{G1}{1 + G1 g_m r_0} \approx \frac{1}{g_m r_0}$$

The ratio of the output to the input, T(s), is the closed loop gain of the system and represents how much the input or reference signal has been amplified at the output. When the complex function s is set to zero, the transfer function of the equation is equivalent to the inverse of gm $r_0$.

Figure 4:
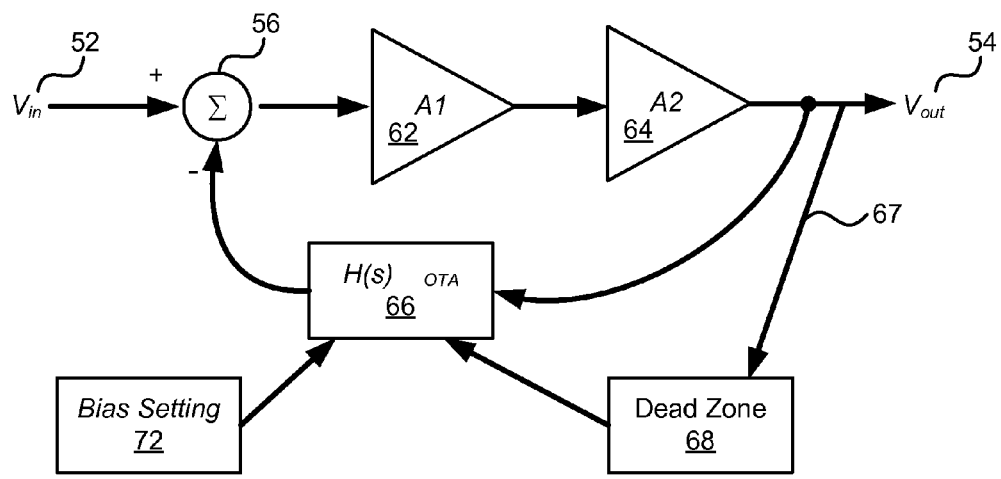
FIG. 4 is an expanded representation of a first-order feedback system used to remove the DC bias from an input signal which further incorporates dead zone and bias setting circuit blocks in the feedback loop.

With no additional control, the transient recovery of the feedback system shown in FIG. 3 is limited to the architecture's natural time constant ($\tau \approx C/(G1gm)$). To improve this recovery time, additional controls can be added to change the feedback time constant, or change the feedback loop gain. FIG. 4 shows an improved feedback architecture that has a parallel feedback path 67. The forward gain stage 58 is replaced by the two gain stages 62 and 64. The feedback block 60 is replaced with an operational transconductance amplifier (OTA) 66. Both of the two gain stages 62 and 64, and the OTA 66 are typical components used in front-end circuit architectures. The parallel feedback path 67 has a "Dead Zone" (DZ) circuit 68 that can be used to vary the feedback loop gain, which has the same effect as varying the time constant. When the voltage output coming from gain stage 64 is within a predefined voltage range (the "Dead Zone"), the DZ circuit 68 makes no changes to the loop gain of the circuit. However, when a large voltage offset is detected at the output of gain stage 64, the DZ circuit 68 increases the loop gain which correspondingly decreases the time constant of the amplifier. This makes the transient response of the circuit much faster by increasing the high pass frequency response. The DZ circuit can apply a sloped gain (V2/V1) or an immediate "bang-high" level, depending on the implementation desired.

An additional component of the first-order feedback system detailed in FIG. 4 is the bias setting block 72, which inputs its value into the OTA 66. The value output of the bias setting block 72 is the correct bias value for the read sensor (not shown), and allows the amplifier to utilize the bias information to decrease the recovery time by predicting exactly how much of a bias offset to use. The bias setting block 72 will be discussed later in more detail.

Figure 5:
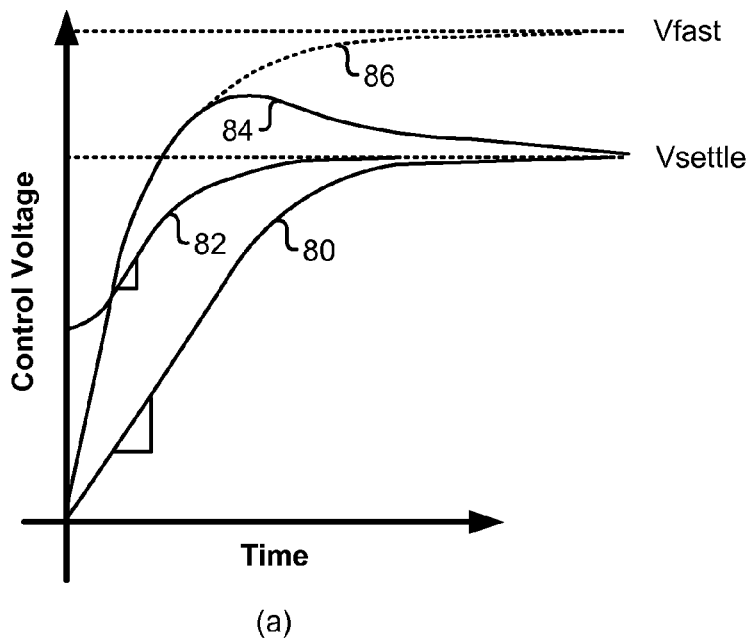
FIGS. 5a and 5b show time and frequency responses for the different conditions of the first-order feedback system of FIG. 4.
Figure 5:
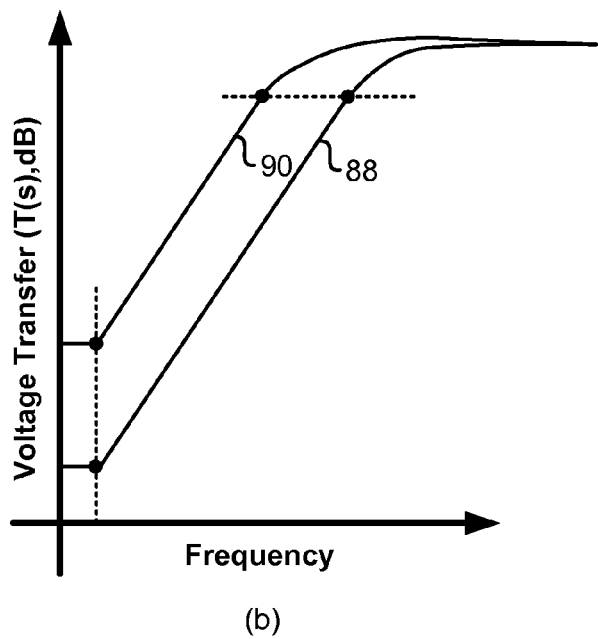

FIGS. 5a and 5b show respectively, the time and frequency responses for different conditions of the first order feedback system shown in FIG. 4. The natural response 80 of a typical feedback system is first shown when the time constant $\tau \approx C/(G1gm)$, and gradually approaches the Vsettle level. In the early stages of operation, the natural response 80 of the system is slew rate limited in that the amplifier output cannot keep up with rapid increases in the input voltage, which can cause the input stage to saturate. While in saturation, the output voltage from the feedback system is a slow ramp of almost constant slope, and gradually changes after the slew period. A response 86 is shown when a larger loop gain is applied to the circuit, and the voltage eventually settles at voltage Vfast, which is at a higher voltage level that Vsettle. Response 84 shows the result of using a feedback system with only a DZ block to create a dynamic-feedback compensation scheme. The response 84 rises initially at the same slope as response 86, towards voltage Vfast but eventually settles towards Vsettle as a result of the return of the loop gain caused by the output voltage within the range of DZ block. However, the recovery time did not decrease by a significant amount, because of the changing loop gain or target values, Vfast and Vsettle.

The DCSB amplifier utilizes a combination of a feed-forward compensation scheme in conjunction with the dead-zone block 68 shown in FIG. 4 to decrease the recovery time. The feed-forward compensation scheme used starts at a closer voltage to Vsettle. This compensation scheme is created through the Bias Setting block 72 shown in FIG. 4. Since the bias voltage is known, a predetermined bias setting value can be chosen to be near the DC operating point for the feedback system. With feed-forward compensation, the control-voltage level settles faster to the Vsettle voltage level as compared to the natural response of the feedback, as indicated by the response 82 in FIG. 5a.

FIG. 5b shows the corresponding frequency response change when changing the loop gain. High-pass response 90 is the target response of the system, while response 88 represents the response when the loop gain is increased. In particular, the high-pass frequency of response 88 is noticeably higher at the same level of voltage transfer. The frequency of response of 88 is only temporary while the amplifier and feedback loop settles. Using DCSB, allows for a faster (82) recovery and gradual transition from the frequency of response 88 to 90.

Having described the characteristics for a DCSB amplifier and some general implementations, specific embodiments of the DCSB amplifier are now described with reference to the accompanying drawings.

The first main block of the DCSB amplifier is the OTA, as used within the first-order feedback system described in FIG. 4. Now, specific embodiments of the OTA are described. The OTA can be implemented with an internal voltage buffer stage OTA 100, shown in FIG. 6a, or as a standard current output stage OTA 120, shown in FIG. 6b. In both cases a two-input OTA is used to implement the DCSB amplifier, with one input being the feed-forward compensation bias setting voltage ($V_{bias}$) 124 which is used to set an initial target for the OTA, and the second input being the voltage offset 126 from the output of the amplifier. The output of the OTA can be through a voltage stage 112 in FIG. 6a or a current output 128 in FIG. 6b. Either output buffer can be implemented and used. However, the OTA with a voltage stage has the advantage of not requiring a common-mode control, because typically disk drive front-end amplifiers are differential amplifiers that require a floating potential input controlled near the potential of the disk drive media. The OTA with a voltage buffer stage 100 uses two isolation resistors 108 and 110 connected to the output.

Figure 7A:
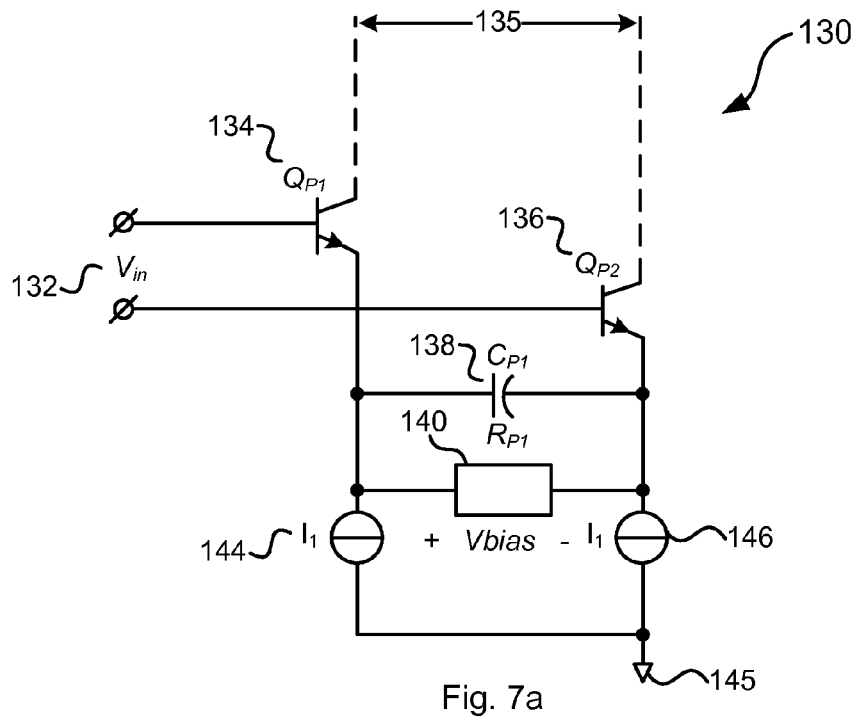
FIGS. 7a and 7b show two implementations of transistor configurations for a first stage amplifier using a passive transistor configuration and an active transistor configuration, respectively.
Figure 7B:
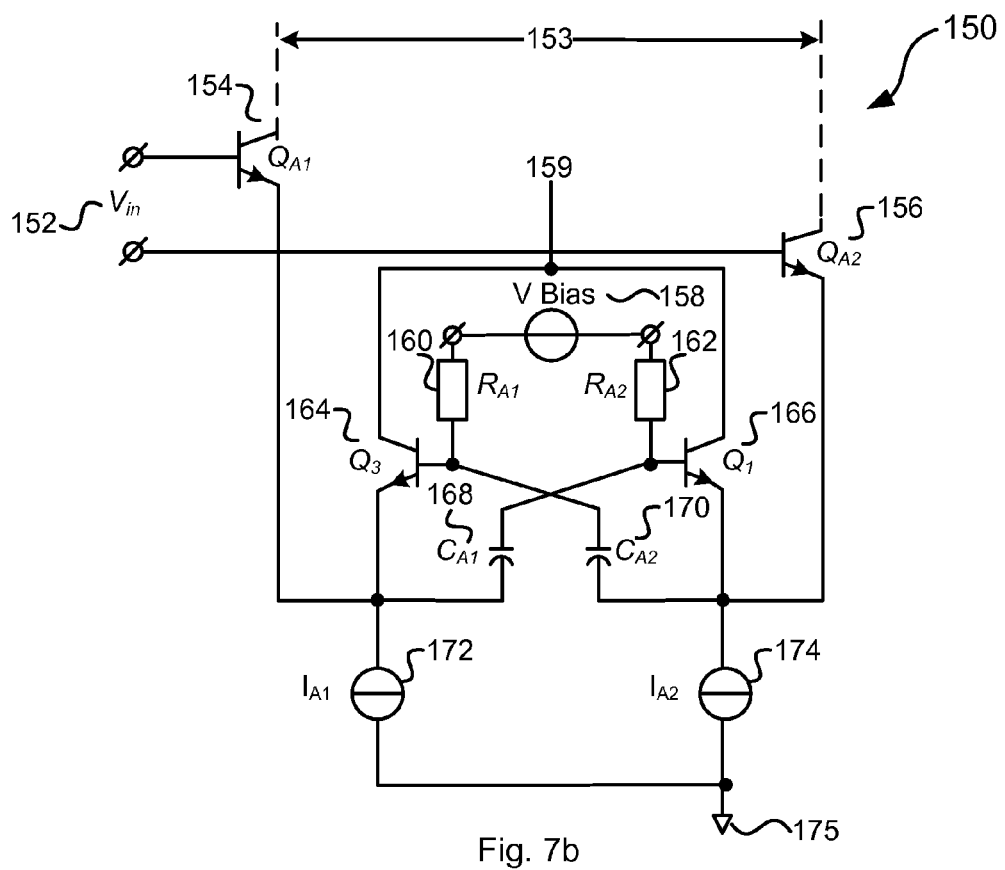

The second main block for a DCSB amplifier is the first stage amplifier 62 (see FIG. 4), whose transistor configuration is described in more detail in FIGS. 7a and 7b. The DCSB amplifier uses a transistor configuration that has the voltage bias imposed at the amplifier's input stage. Shown in FIGS. 7a and 7b are two examples of the types of transistor configurations that may be used for a preamplifier circuit within the DCSB amplifier.

FIG. 7a is a schematic diagram of a preamplifier circuit 130 which may be referred to as a common-emitter amplifier. The preamplifier circuit 130 includes transistors 134 and 136 (denoted $Q_{P1}$ and $Q_{P2}$, respectively), fixed current sources 144 and 146, resistor 140 and a capacitor 138. The transistor configuration in FIG. 7a shows the bias voltage placed at the emitters of the transistors 134 and 136 by a passive device 140, a resistor. A differential input 132 of the preamplifier circuit 130 at $V_{in}$ is provided at the bases of the transistors 134 and 136, whereas a differential output 135 of the preamplifier circuit 130 is provided at the collectors of the transistors 134 and 136. A first end of the current source 144 is coupled to the emitter of the transistor 134 and a second end of the current source 144 is coupled to a voltage source 145. Similarly, a first end of the current source 146 is coupled to the emitter of the transistor 136 and a second end of the current source 146 is coupled to the voltage reference 145. The capacitor 138 is shunted across the emitters of the transistors 134 and 136. The transistor configuration in FIG. 7a is named transistor configuration passive (TCP) due to the passive element 140 used in the configuration.

In FIG. 7b, the preamplifier circuit 150 generally includes transistors 154, 156, 164, and 166 (denoted in FIG. 7b as $Q_{A1}$, $Q_{A2}$, $Q_3$, and $Q_4$, respectively); fixed current sources 172 and 174; capacitive elements 168 and 170; resistive elements 160 and 162; and DC bias voltage 158. The transistor configuration in FIG. 7b shows the bias voltage placed at the emitters of transistors 154 and 156 by active devices 164 and 166 typically implemented as transistors. The transistor configuration shown in FIG. 7b is named transistor configuration active (TCA). A differential input $V_{in}$ 152 of the preamplifier circuit 150 is provided at the bases of transistors 154 and 156, whereas a differential output 153 of the preamplifier circuit 150 is provided at the collectors of transistors 154 and 156. The differential output 153 provides an amplified version of the signal provided at the differential input.

The transistor 154 ("$Q_{A1}$") has a base coupled to a first input node of the differential input 152, a collector coupled an output node differential output 153, and an emitter coupled to a first end of the current source 172. The transistor 156 ("$Q_{A2}$") has a base coupled to a second input node of the differential input 152, a collector coupled to an output node differential output 153, and an emitter coupled to a first end of the current source 174. The transistor 164 ("$Q_3$") has an emitter coupled to the first end of the current source 172 and to a first end of capacitive element 168, a base coupled to a biasing voltage 158 ($V_{Bias}$) through the resistive element 160 and to a first end of the capacitive element 170, and collector coupled to reference voltage 159. The transistor 166 ("$Q_4$") has an emitter coupled to the first end of the current source 174 and to a second end of the capacitive element 170, a base coupled to biasing voltage 158 ($V_{Bias}$) through the resistive element 162 and to a second end of the capacitive element 168, and a collector coupled to reference voltage source 159. The resistors 160 and 162 reduce the noise from the bias voltage source 158. In addition, the capacitors 168 and 170 significantly reduce the noise produced by the transistors 164 and 166. The current sources 172 and 174 each have second ends which are coupled to a second voltage reference 175.

The preamplifier circuit 150 may be referred to as a bi-variant coupled-pair (BVCP) circuit as it utilizes the double-pair bipolar transistor topology shown in FIG. 7b. The transistors 154 and 156 (QA1 & $Q_{A2}$) are the input transistor pair, whereas the transistors 164 and 166 ($Q_3$ & $Q_4$) are the DC bias transistor pair for the voltage input 152. Fixed current sources 172 and 174, which are typically set to the same current value, are used for biasing all transistors 154, 156, 164, 166. The fixed DC bias voltage 158 ($V_{Bias}$) is applied at the ends of "isolation" resistors 160 and 162 as shown in FIG. 7b.

Figure 8:
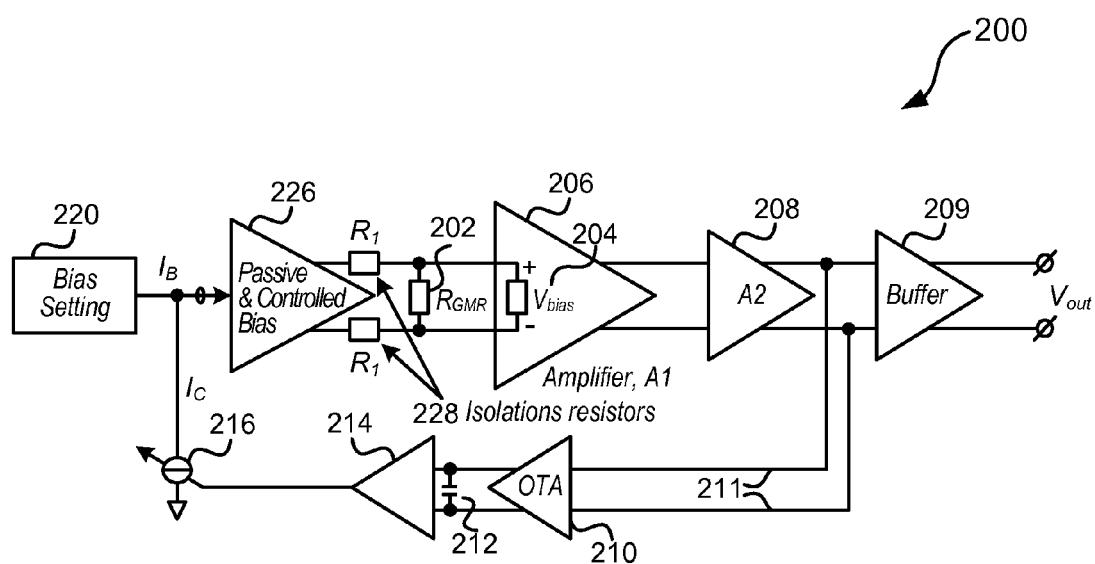
FIG. 8 shows a direct-coupled wide-bandwidth front-end with smart bias control (DCSB) amplifier that uses a stored bias setting to set the bias-setting applied to the read sensor according to one embodiment of the present invention.

FIG. 8 shows a first exemplary embodiment of the DCSB amplifier 200 implemented using a two-input transimpedance amplifier 226 and with the amplifier separated into two stages 206 and 208. The gain stage of the amplifier 206 can be implemented as transistor configuration passive (TCP) or transistor configuration active (TCA).

A bias voltage is first provided across a GMR sensor 202, which is responsive to magnetic flux changes that represent the data stored on the disk (not shown) being read from. A typical value for the bias voltage is 100 mV. The read sensor 202 is connected in parallel with a voltage bias 204 within the gain stage amplifier 206, implemented in either a TCP or TCA configuration as described in FIGS. 7a and 7b. The signal received from the read sensor 202 is then amplified by gain stage amplifier 206, and then passed to a second amplifier 208, for further amplification. Amplifiers 206 and 208 may be implemented as one amplifier, or may be implemented with multiple amplifiers processing the read-back signal. After the signal has passed through amplifiers 206 and 208, it then passes through output buffer 209 as a differential voltage $V_{out}$. The use of output buffer 209 is optional.

Figure 6A:
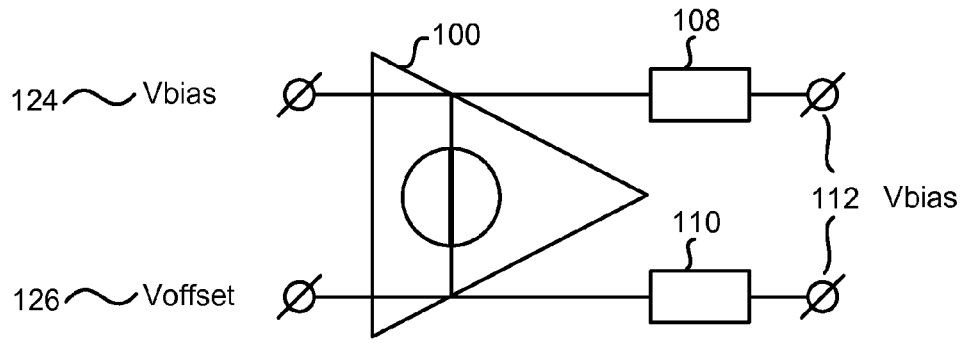
FIGS. 6a and 6b show two implementations of a two-input operational transconductance amplifier (OTA) with an internal voltage buffer stage and a standard current output stage.
Figure 6B:
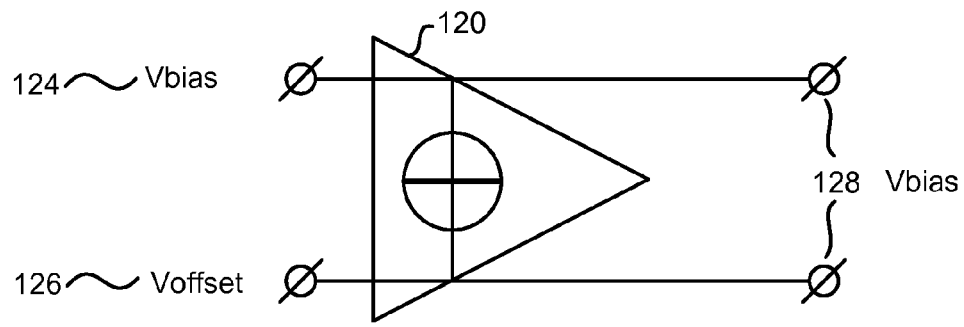

A feedback loop 211 is coupled to the output of amplifier 208, which is then coupled to the input of an OTA 210. The OTA 210 may have a voltage buffer or an output current stage as shown in FIGS. 6a and 6b, depending on the implementation. In the present embodiment of the invention shown in FIG. 8, the OTA 210 is implemented with a voltage buffer stage OTA. The feedback loop 211 is used to separate and suppress the bias voltage from the signal being amplified from disk. The OTA 210 senses the output voltage from the amplifier 208 and generates a current proportional to the voltage from the amplifier 208 as a method of dynamic feedback. Depending on the output voltage, the OTA 210 can be implemented to use a "timed bang," or a set duration where the loop gain is increased, thus increasing the frequency response. After that duration is over, the OTA 210 reverts back to its normal operation. The OTA 210 is typically implemented as a high-bandwidth OTA. The output of the OTA 210 is then coupled with a parallel-connected high-frequency (HF)-blocking capacitor 212 used as a low-pass filter. The HF-blocking capacitor 212 removes high-frequency content in the signal, and passes the signal on to a second buffer 214. Within this embodiment the buffer 214 is implemented as a voltage source type, but alternatively could also be implemented as a current source type. The voltage output from the buffer 214 is then input to an adjustable current source 216, which provides a feedback current $I_C$ based on the voltage output from the buffer 214. The feedback current $I_C$ is then provided as one input to the two-input transimpedance amplifier 226. The second input $I_B$ is provided from bias setting block 220, which provides a feed-forward bias depending on the bias voltage and resistance of the GMR sensor. The equation for the feed-forward compensation value can be determined by the following equation:

$$I_B = \frac{V_{Bias}}{R_{GMR}} \frac{(2R_1 + R_{GMR})}{(2R_1 + R_{Nom.})}$$

$R_{Nom}$ is the average resistance value of the read sensor. The feed-forward compensation depends on the GMR resistance, so that the DC operating point of the feedback system is preset, meaning that the "turn on" operating point is near the target voltage. The transimpedance amplifier 226 sums currents $I_B$ and $I_C$ and produces a passive and controlled bias voltage as the output. This voltage is then applied across the isolation resistors 228 (each having a resistance $R_1$), which are coupled to the output of the transimpedance amplifier. The bias voltage is then applied to the GMR sensor 202.

The advantages of the DCSB amplifier 200 as implemented in FIG. 8 include the fact that the high-pass-pole frequency response of the amplifier can be controlled by having dynamic feedback, so that the loop gain of the system can be appropriately adjusted. The single high-pass pole of the frequency response further allows for easy control of the front-end high-pass response. With this architecture, there are no capacitors connected in series with the signal path, and thus there is no transient recovery dependencies or AC coupling as a result. Additionally, the front-end portion of the circuit does not require common-mode feedback.

Figure 9:
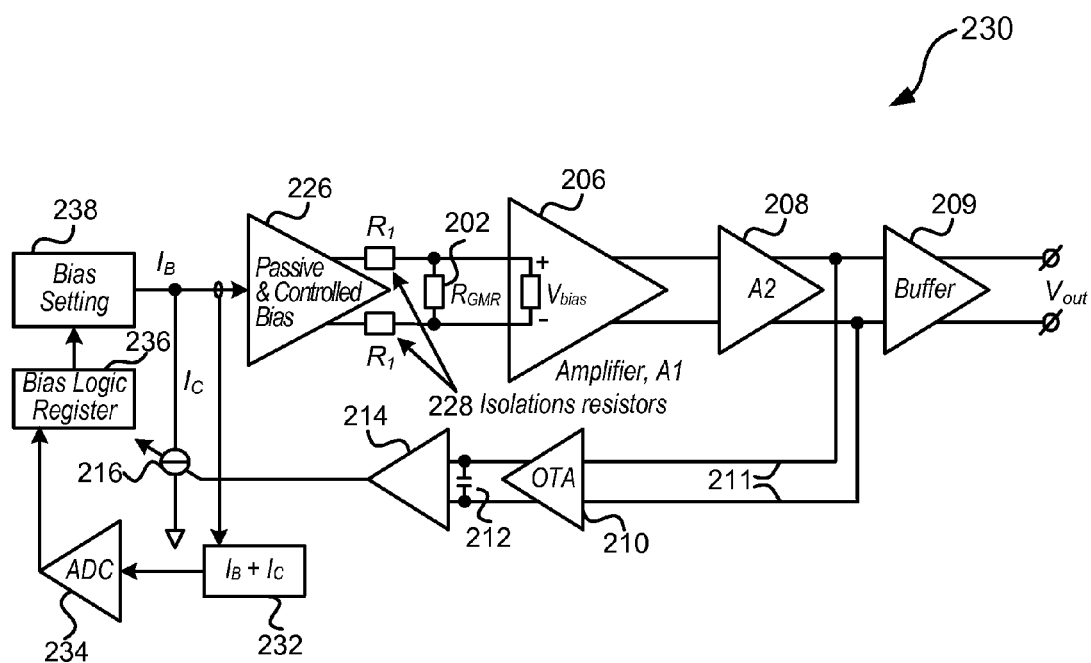
FIG. 9 shows a DCSB amplifier with a smart bias implementation to self-train the bias setting applied to the read sensor according to another embodiment of the present invention.

FIG. 9 shows a second embodiment of the DCSB amplifier 230 that utilizes smart bias to enable the architecture to have self-training, thus reducing the recovery time of the circuit by providing a bias voltage closer to the voltage settle level, as shown in FIG. 5a. Many of the components in the first embodiment of the DCSB amplifier 200 as shown in FIG. 8 are found in the second embodiment of the DCSB amplifier 230 as shown in FIG. 9. The DCSB amplifier 230 of FIG. 9 includes additional components for a self training process to determine the bias current $I_B$. A current summing unit 232, an analog-to-digital converter (ADC) 234, and a bias logic register 236 have been added into first embodiment shown in FIG. 8. The current summing unit sums the feed-forward bias register current $I_B$ from a bias setting circuit block 238 and the analog feedback current $I_C$ 218. The ADC 234 converts the sum of the currents into digital bits. After the conversion, the digital value of the current is then stored into the bias logic register 236, thereby storing the DC operating point of the amplifier. In the DCSB amplifier 200 shown in FIG. 8, the bias setting circuit block 220 obtains the current value $I_B$ from the bias equation above. The bias equation used in FIG. 8 to find the bias current $I_B$ can have inaccuracies from variations in integrated circuit (IC) manufacturing and variations in the resistance of the read sensor 202. The self training process shown in FIG. 9 eliminates these types of inaccuracies.

To summarize, the smart bias or self-training DCSB amplifier 230 possesses a number of features that help distinguish it from conventional amplifiers. It uses feed-forward compensation to help determine an accurate bias voltage, which in turn decreases recovery time between write and read modes. The amplifier 230 can also self-train to determine precise digital values for the DC operating point of the amplifier 230, can update after each port selection for output, and can automatically store the resistance value of the GMR sensor 202 in the bias logic register 236.

Figure 10:
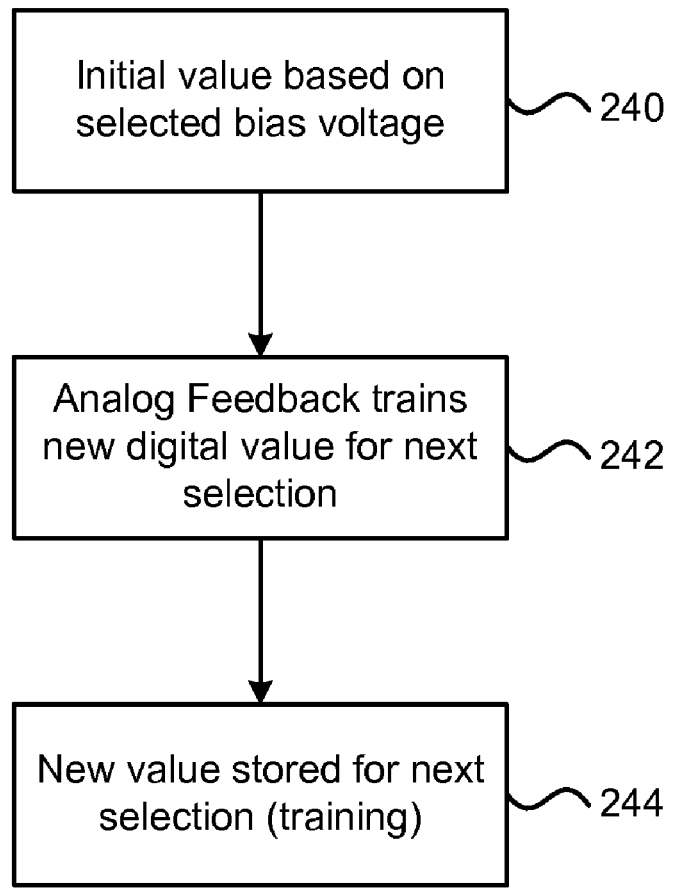
FIG. 10 is a flowchart showing operation of a self-training sequence using a bias register.

FIG. 10 is a flowchart further illustrating the operation of the self-training sequence used in the DCSB amplifier 230 of FIG. 9. In step 240, the smart bias is initially chosen with an initially low feed-forward compensation value so as not to damage the read sensor by exposing it to a high voltage. Once the DCSB amplifier has been activated, the analog feedback will determine the new digital value for the next selection in step 242. After the digital value for the next selection has been determined, it is then stored in the bias logic register 236 for the next selection in step 244. Thus, even if the register's digital values were lost such as when the power supplies for the circuit are abruptly shut off, the DCSB would be able to begin the self-training process when the power supplies are next powered up.

Figure 11:
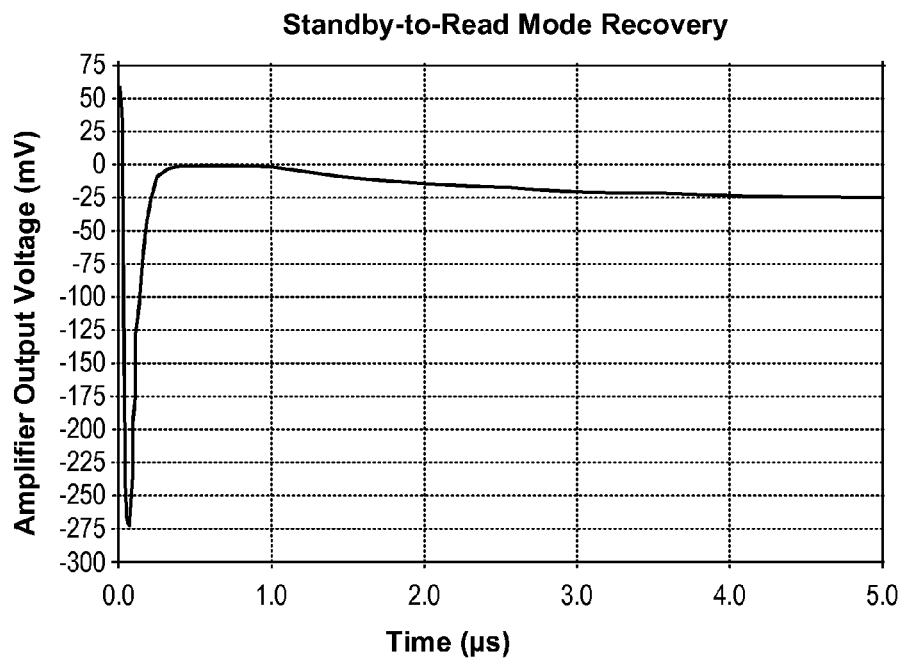
FIG. 11 is a graph showing the write-to-read recovery of the DCSB amplifier.
Figure 12:
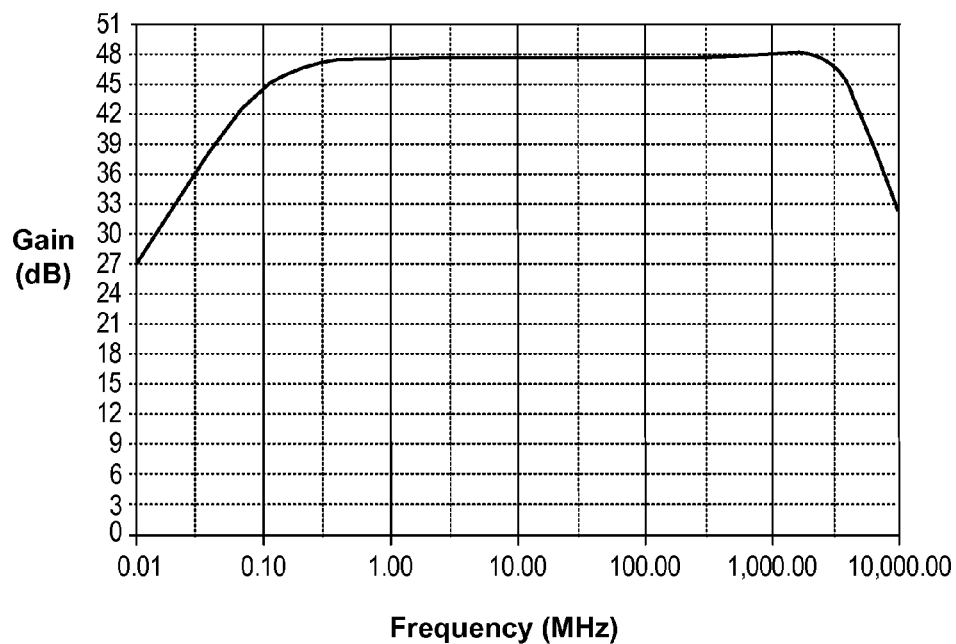
FIG. 12 is a graph showing the ultra-low high-pass response of the DCSB amplifier.
Figure 13:
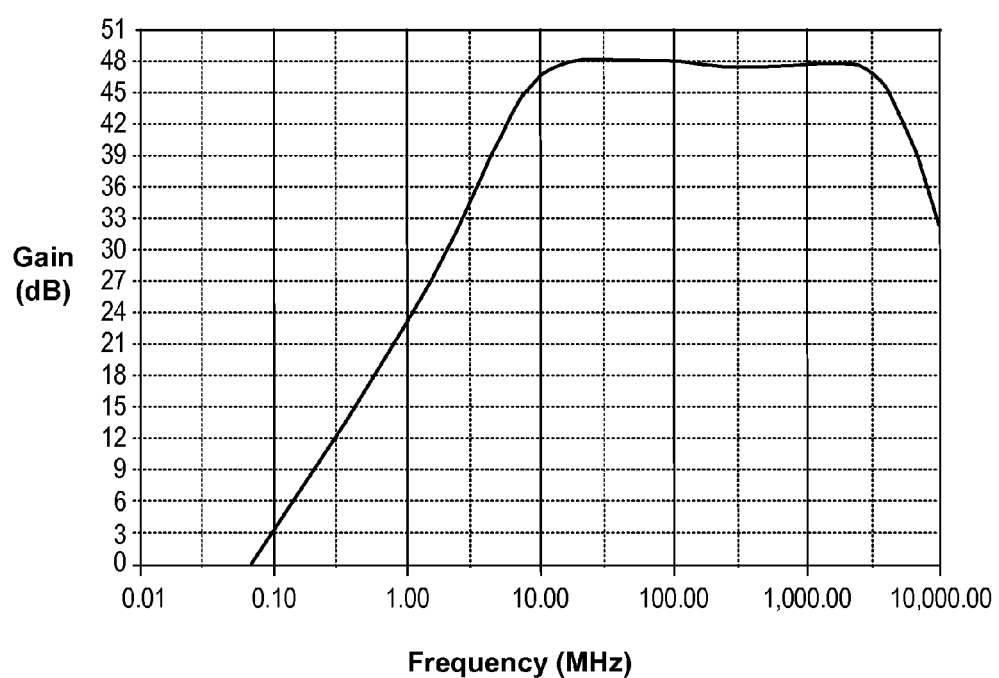
FIG. 13 is a graph showing a higher high-pass response of the DCSB amplifier.

FIGS. 11-13 are graphs that illustrate the performance of the DCSB amplifier. FIG. 11 shows the write-read mode transient recovery of the DCSB amplifier. When first turned on, the circuit exhibits a sharp drop in the output voltage but quickly stabilizes to the natural response near −25 mV for the output voltage. This displays a shortened transient recovery period using the DCSB amplifier as implemented.

FIGS. 12 and 13 show the frequency response pattern for the DCSB amplifier with different loop gain settings. These two plots show a large dynamic range in the high-pass pole frequency setting. In particular, the frequency response of FIG. 12 shows good coverage of low frequency responses in comparison to known designs. FIG. 13 differs from FIG. 12 in that the loop gain for the DCSB amplifier has been increased, by changing the transconductance Gm value of at least one amplifier. This shifts the frequency response of the amplifier higher, thus narrowing the bandwidth of the frequency response. The DCSB amplifier allows for a dynamic range of the frequency response for the signal inputs.

Figure 14:
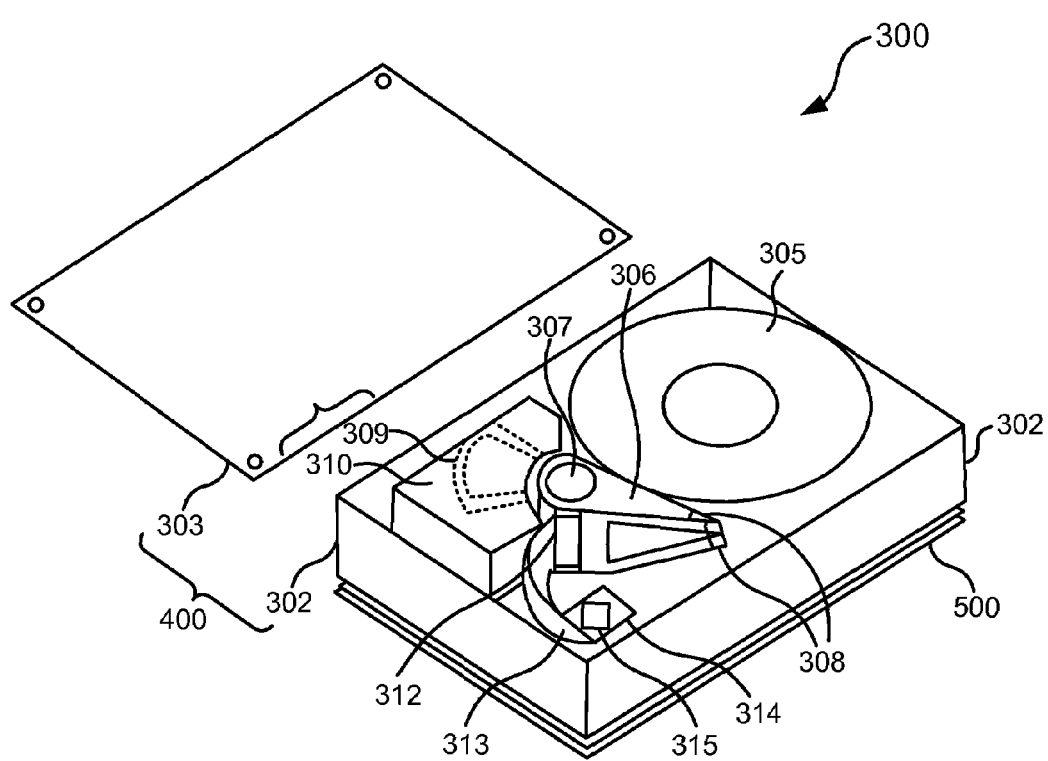
FIG. 14 is a schematic perspective view of a hard disk drive (HDD).
Figure 15:
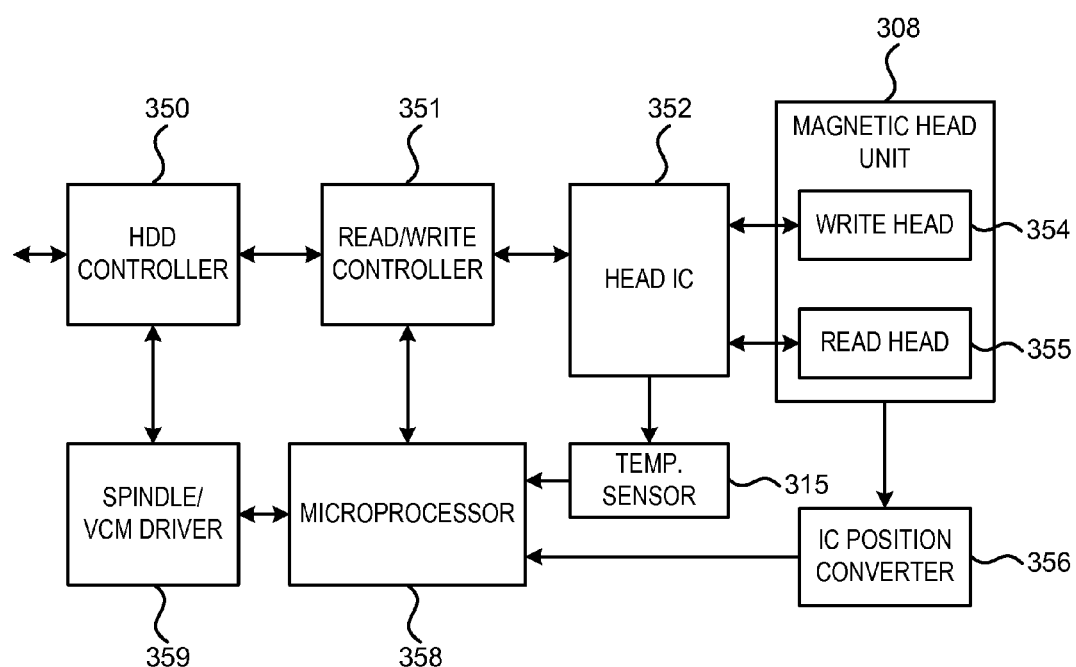
FIG. 15 is a functional block diagram of a HDD.

The DCSB amplifier can be implemented in a hard disk drive (HDD) device. FIG. 14 is a schematic perspective view of a hard disk drive (HDD) 300, while FIG. 15 is a functional block diagram of the HDD 300. As shown in FIG. 14, the HDD 300, which serves as a data storage device, includes a disk enclosure 400, which is formulated by installing a top cover 303 to seal the open top of a box-shaped base 302, which is made, for instance, of an aluminum alloy. The top cover 303 is made, for instance, of stainless steel, and screwed down to the base 302 by a sealing member (not shown), which is shaped as a rectangular frame. The disk enclosure 400 contains a spindle motor 304, which comprises, for instance, a hub-in, three-phase DC servo motor. The spindle motor 304 imparts rotary drive to a magnetic disk 305, which is a storage medium. One or more units of magnetic disk 305 are installed in compliance with the storage capacity requirements for the HDD 300. A card 500 is attached to the lower surface of the base 302. The card 500 carries a signal processing circuit, a drive circuit for the spindle motor 304, and other components described later.

An actuator arm 306 is mounted within the disk enclosure 400. The middle section of the actuator arm 306 is supported above the base 302 so that it can pivot on a pivot axis 307. A composite magnetic head 308 is mounted on one end of the actuator arm 306. A VCM (voice coil motor) coil 309 is mounted on the remaining end of the actuator arm 306. The VCM coil 309 and a stator 310, which is made of a permanent magnet and fastened to the disk enclosure 400, constitute a VCM 311. When a VCM current flows to the VCM coil 309, the actuator arm 306 can move to a specified position over the magnetic disk 305. This movement causes the composite magnetic head 308 to perform a seek operation. The magnetic disk 305 is driven to rotate around a spindle axis of the spindle motor 304. When the HDD 300 does not operate, the magnetic disk 305 comes to a standstill.

The composite magnetic head unit 308 is a combination of an ILS (integrated lead suspension) (not shown), a read sensor 355, which may comprise a GMR (giant magnetoresistive) sensor, and a write element 354, which may comprise an induction-type converter. The read sensor 355 and write element 354 are shown in FIG. 15, a block diagram of the control system. The read sensor 355 reads servo information when it reads data, writes data, or performs a seek operation. For a data read operation, the read sensor 355 also reads data between items of servo information. For a data write or data read, the actuator arm 306 pivots over the surface of the magnetic disk 305 during its rotation so that the composite magnetic head unit 353 performs a seek operation to scan for an arbitrary track on the magnetic disk 305. In this instance, the ABS (air bearing surface) of the composite magnetic head unit 308, which faces the magnetic disk, receives a lift force due to an air current generated between the ABS and the magnetic disk 305. As a result, the composite magnetic head unit 308 constantly hovers a predetermined distance above the surface of the magnetic disk 305.

The read sensor 355 and write element 354, which constitute the composite magnetic head unit 308, are electrically connected to the head IC 352, which is mounted on a lateral surface of the pivot axis 307 of the actuator arm 306 shown in FIGS. 14 and 15. One end of a flex cable 313 is connected to the head IC 352 to permit data exchange with the card 500. A connector 314 is attached to the remaining end of the flex cable 313 for connecting to the card 500. A temperature sensor 315 is mounted on the upper surface of the connector 314 to measure the temperature inside the disk enclosure 400 (the ambient temperature for the magnetic disk 305). The DCSB amplifier 312 supplies a bias current to the read sensor 355, amplifies a microscopic playback signal of the read sensor 355, which captures magnetic flux variations in a data pattern stored on the magnetic disk 305, and supplies a write current to the write element 354 in accordance with a data pattern at the time of a data write.

The card 500 includes electronic circuits shown in FIG. 15, which control the operation of the actuator arm 306 and perform data read/write operations in relation to the magnetic disk 305. The card 500 controls the rotation of the magnetic disk 305 through a spindle/VCM driver 359 and drives the VCM coil 309 to control the seek operation of the actuator arm 306.

The HDD controller 350 transfers data between an external host (not shown) and the magnetic disk 305, generates a position error signal (PES) from servo data, and transmits the positional information about the composite magnetic head 308 to a read/write controller 351 and microprocessor 358. In accordance with the control information from the microprocessor 358, the spindle/VCM driver 359 drives the VCM coil 309 to position the composite magnetic head 308 on the specified track. The positioning of the magnetic head unit 308 is determined by an IC position converter 356 in response to a signal from the magnetic head unit 308. The microprocessor 358 further interprets a command that is transmitted from an external host (not shown) through the HDD controller 350, and instructs the HDD controller 350 to perform a data read/write operation in relation to an address specified by the command. In accordance with the positional information about the composite magnetic head 308, which is generated by the HDD controller 350, microprocessor 358 also transmits control information to the spindle/VCM driver 359 for the purpose of performing a seek operation to position the composite magnetic head 308 on a specified track.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A circuit for amplifying data signals, the circuit comprising:
    a magnetoresistive sensor having a bias voltage applied thereto;
    a signal amplifier which amplifies a signal detected by the magnetoresistive sensor having the bias voltage applied thereto;
    a feedback control block which is coupled to an output of the signal amplifier and outputs a feedback current used to vary a loop gain of the circuit;
    a bias setting circuit which outputs a bias setting current;
    a transimpedance amplifier which receives the bias setting current from the bias setting block and the feedback current from the feedback control block and generates the bias voltage applied to the magnetoresistive sensor, the circuit further comprising:
    a current summing unit which acquires a sum of the bias setting current and the feedback current received by the transimpedance amplifier;
    an analog-to-digital converter which converts the sum of the bias setting current and the feedback current to a digital value; and
    a bias logic register which stores the digital value received from the analog-to-digital converter and outputs the digital value to the bias setting circuit to modify the bias setting current based on the digital value.

2. The circuit of claim 1:
    wherein the magnetoresistive head is a giant magnetoresistive head;

wherein a pair of isolation resistors are coupled to the output of the transimpedance amplifier, and are disposed between the transimpedance amplifier and the magnetoresistive head;

wherein the bias setting current $I_B$ is calculated based on:

$$I_B = \frac{V_{Bias}}{R_{GMR}} \frac{(2R_1 + R_{GMR})}{(2R_1 + R_{Nom.})}$$

where $V_{Bias}$ is the bias voltage, $R_{GMR}$ is a resistance of the giant magnetoresistive head, $R_1$ is a resistance of each of the pair of isolation resistors, and $R_{Nom.}$ is the average resistance value for the read sensor.

3. The circuit of claim 1 wherein the magnetoresistive sensor comprises one of a giant magnetoresistive read head or a tunneling magnetoresistive read head.

4. The circuit of claim 1 wherein the signal amplifier uses one of a passive transistor configuration or an active transistor configuration.

5. The circuit of claim 1 wherein the bias voltage is interposed at an input of the signal amplifier and the magnetoresistive sensor is connected in parallel with the voltage bias.

6. The circuit of claim 1 further comprising a second amplifier connected to the outputs of the signal amplifier in series and disposed between the signal amplifier and the feedback control block.

7. The data storage device of claim 1 wherein the amplifier circuit further comprises a self-training circuit configured to modify the bias setting current generated by the bias setting circuit.

8. The data storage device of claim 7, wherein the self-training circuit comprises:
a current summing unit which acquires a sum of the bias setting current and the feedback current received by the transimpedance amplifier;
an analog-to-digital converter which converts the sum of the bias setting current and the feedback current to a digital value; and
a bias logic register which stores the digital value received from the analog-to-digital converter and outputs the digital value to the bias setting circuit to modify the bias setting current based on the digital value.

9. A circuit for amplifying data signals, the circuit comprising:
a magnetoresistive sensor having a bias voltage applied thereto;
a signal amplifier which amplifies a signal detected by the magnetoresistive sensor having the bias voltage applied thereto;
a feedback control block which is coupled to an output of the signal amplifier and outputs a feedback current used to vary a loop gain of the circuit;
a bias setting circuit which outputs a bias setting current;
a transimpedance amplifier which receives the bias setting current from the bias setting block and the feedback current from the feedback control block and generates the bias voltage applied to the magnetoresistive sensor,
wherein the feedback control block comprises:
an operational transconductance amplifier (OTA) which is coupled to an output of the signal amplifier and outputs a first feedback current proportional to the signal at the output of the signal amplifier;
a capacitor coupled between outputs of the OTA as a low-pass filter;
a buffer circuit coupled to the capacitor which outputs a feedback voltage based on applying the first feedback current across the capacitor to generate the feedback voltage; and
an adjustable current source which outputs the feedback current proportional to the feedback voltage from the buffer circuit, the feedback current being received by the transimpedance amplifier.

10. The circuit of claim 9 wherein the OTA increases the loop gain of the circuit for a predetermined period when the output of the signal amplifier is high.

11. The circuit of claim 9 wherein the OTA comprises a dead zone circuit configured to change the loop gain in response to the output of the signal amplifier.

12. The circuit of claim 9 wherein the OTA comprises one of a voltage-to-current output type OTA or a voltage buffer stage type OTA.

13. The circuit of claim 9 wherein the buffer circuit is one of a voltage source type buffer circuit or a current source type buffer circuit.

14. A circuit for amplifying data signals, the circuit comprising:
a magnetoresistive sensor having a bias voltage applied thereto;
amplifying means for amplifying a signal detected by the magnetoresistive sensor having the bias voltage applied thereto;
feedback means for generating, based on an Output of the amplifying means, a feedback current used to vary a loop gain of the circuit;
bias setting means for generating a bias setting current;
a transimpedance amplifier which receives the bias setting current from the bias setting means and the feedback current from the feedback means and generates the bias voltage applied to the magnetoresistive sensor; the circuit further comprising self-training means for self-training the bias setting current generated by the bias setting means.

* * * * *